Oct. 29, 1940.      F. T. COURT      2,219,916
CORN SHELLER
Filed June 3, 1937      2 Sheets-Sheet 1
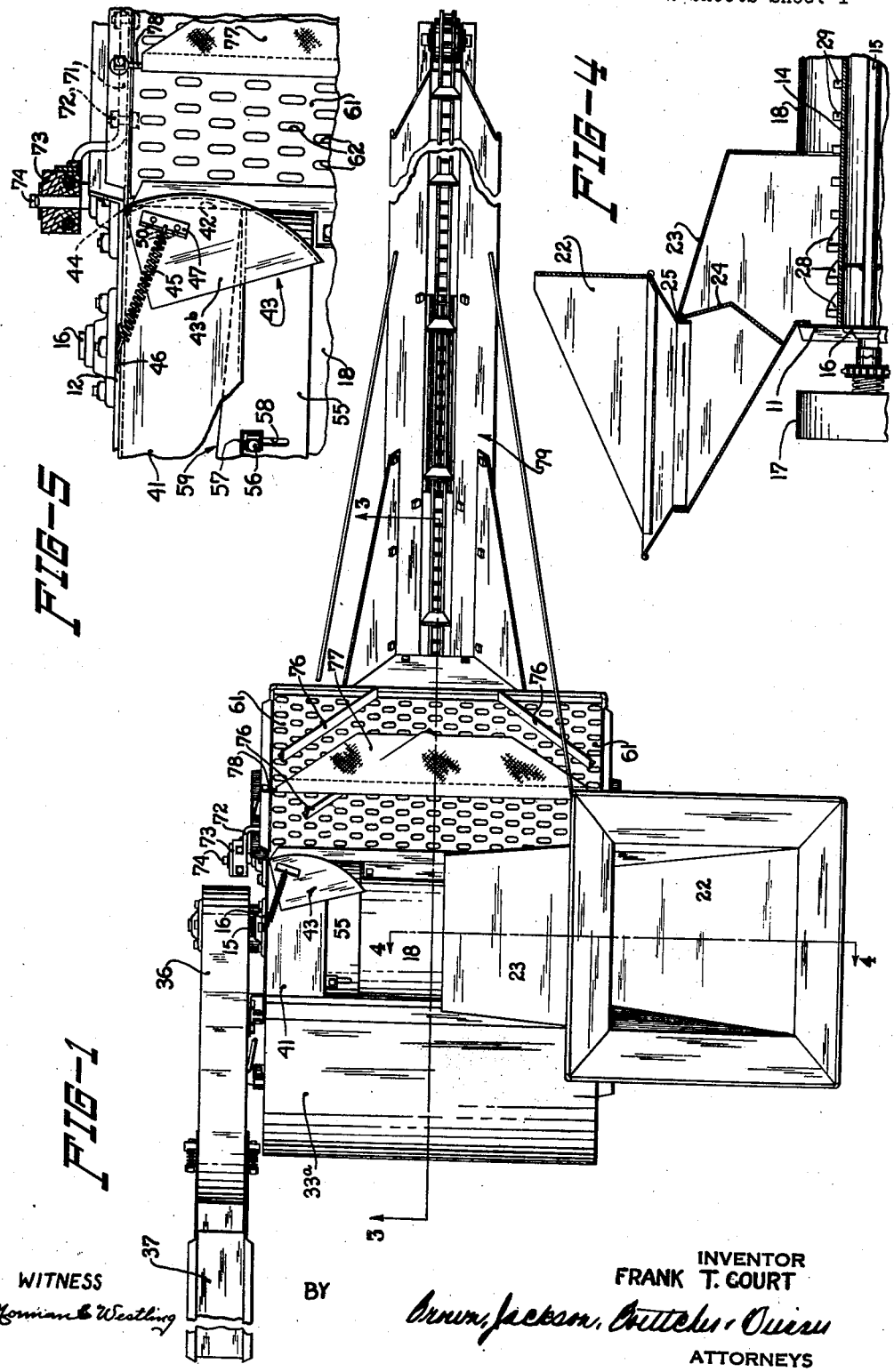
WITNESS
INVENTOR
FRANK T. COURT
BY
ATTORNEYS

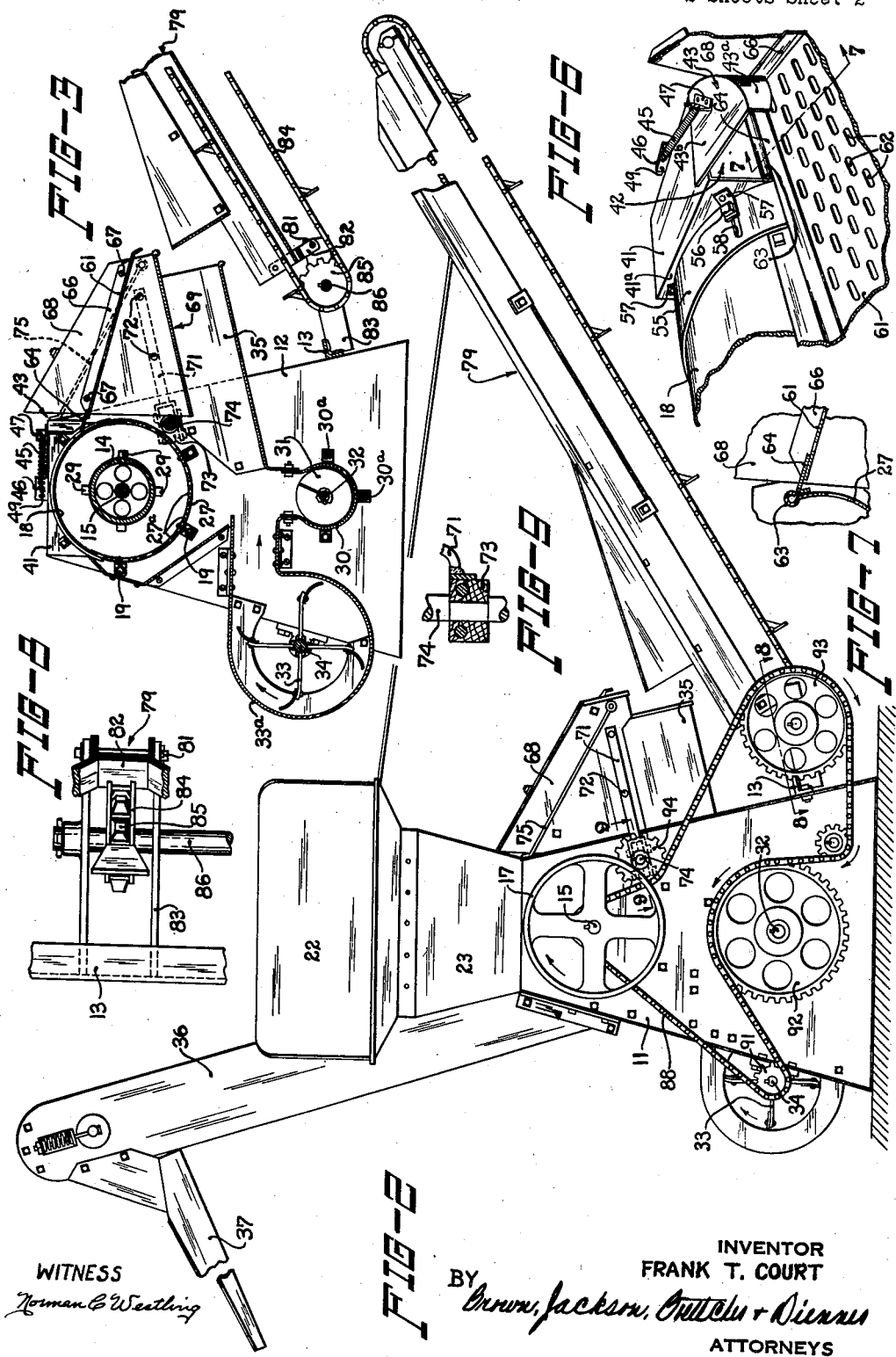

Patented Oct. 29, 1940

2,219,916

UNITED STATES PATENT OFFICE 2,219,916

CORN SHELLER

Frank T. Court, Moline, Ill., assignor to Deere & Company, Moline, Ill., a corporation of Illinois Application June 3, 1937, Serial No. 146,158

23 Claims. (Cl. 130—6)

The present invention relates generally to corn shellers, and more particularly to corn shellers of the power operated cylinder type in which the cobs from which the corn has been shelled are discharged from the cylinder housing or shelling cage in a radial direction.

One of the principal objects of the present invention is to provide an enlarged housing section above the outlet end of the shelling housing for receiving the shelled cobs as they are discharged radially outwardly by the action of the shelling cylinder, together with adjustable means for varying the size of the discharge opening between the shelling housing and said enlarged housing section whereby the movement of the cobs into the enlarged housing portion may be retarded so as to insure successful operation on different sizes and conditions of corn.

Another object of the present invention is to provide spring controlled gate means for retarding the discharge of shelled cobs from the outlet of the enlarged housing section together with means for adjusting said spring to vary the retarding action of said gate means, so as to insure clean shelling under all conditions.

A further object of the invention is to dispose the riddle or cleaning shoe, which receives the shelled cobs from the shelling housing, alongside and extending substantially the full length of said housing instead of at the end thereof, to thereby facilitate the use of a larger riddle and prevent an excess carry-over of shelled corn into the cob pile. To this end the gate means is so formed that it directs the cobs toward the center of this relatively large cleaning shoe whereby the cobs are forced to pass over a large area of the cleaning shoe surface and thus insure the separation of practically all the kernels that may be ejected with the cobs.

A still further object of the invention is the provision of improved means for connecting the cob stacker to the sheller frame whereby the stacker may be easily and quickly disconnected from said frame.

Further objects and advantageous features of the present invention will be apparent from the preferred embodiment thereof as illustrated in the accompanying drawings, in which—

Figure 1 is a top plan view of a corn sheller in which the improvements of the present invention have been embodied;

Figure 2 is an elevational view of the sheller;

Figure 3 is a vertical sectional view taken approximately along the line 3—3 of Figure 1;

Figure 4 is a sectional view taken approximately along the line 4—4 of Figure 1;

Figure 5 is an enlarged top plan fragmentary view of the discharge end of the sheller housing, and illustrating the construction of the means for regulating the discharge of the shelled cobs from the sheller housing to the riddle, the swinging gate retarding means being shown in closed position;

Figure 6 is a perspective view on an enlarged scale of certain of the parts shown in Figure 5, with the gate retarding means in open position;

Figure 7 is a fragmentary sectional view taken approximately on the line 7—7 of Figure 6;

Figure 8 is a fragmentary view taken approximately on the line 8—8 of Figure 2 and showing the means for connecting the cob stacker to the sheller frame; and Figure 9 is a fragmentary sectional view taken approximately on the line 9—9 of Figure 2.

The sheller shown in the accompanying drawings consists of a suitable frame structure comprising spaced apart vertically extending sheet metal side plates 11 and 12 that are connected together by suitable angle bars to form a rigid supporting structure, one of such angle bars being indicated by the reference numeral 13. A shelling cylinder 14 is fixedly supported in any suitable manner on a shaft 15 journaled at its ends in bearings 16 carried by the side plates 11 and 12 of the frame, said shaft 15 extending outwardly of the side plate 11 and having a driving pulley 17 keyed thereto by which the shelling cylinder is rotated. The shelling cylinder 14 is disposed within a cylindrical housing or shelling cage 18 that is fixedly connected at its opposite ends to the two side plates 11 and 12 of the frame by angle brackets and bolts 19 as shown in Figure 3, or in any other suitable manner.

Positioned above and adjacent one end of the cylindrical housing 18 is a feeding hopper 22 that is supported in any suitable manner on the frame and is connected with the housing 18 by a conduit 23. As shown in Figure 4, a control gate 24 is pivotally supported within the conduit 23 on a rod 25 for preventing ears or husks from being thrown back out through the hopper by the action of the shelling cylinder 14. The lower portion of the cylindrical housing 18 is in the form of a perforated sheet as shown at 27 in Figure 3. As shown in Figure 4, the shelling cylinder 14 is provided with two sets of spaced lugs 28 and 29. The lugs 28 adjacent the inlet end of the cylinder are relatively large oblong shaped lugs and are positioned diagonally on the cylinder 14 so as to force the incoming ears of corn more rapidly through the cylindrical housing or shelling cage 18, while the other set of lugs 29 are smaller generally square or rectangular lugs and are positioned on the cylinder 14 in spiral rows which tend to advance the ears of corn through the housing. The two sets of lugs 28 and 29 are preferably secured to the surface of the cylinder by welding.

As the shelling cylinder 14 is rotated the shelling is accomplished by the lugs 28 and 29 turning the ears of corn against the lower perforated sheet 27 of the housing 18 and also forcing the ears against each other, thereby rubbing the kernels of corn off of the cobs as is usual in corn shellers of this type. During this operation the kernels that are removed from the cobs drop through the perforations 27a in the sheet 27 and down into a screw conveyor 31 fixed on a shaft 32, driven as hereinafter described from the shaft 15. The screw conveyor is enclosed by a suitable housing 30, as shown in Figure 3, said housing extending between the side plates 11 and 12 and having its opposite ends connected respectively to said plates in any suitable manner, as by bolts 30a as shown. In their passage to the conveyor the kernels pass through a blast of air that is provided by a fan 33 fixedly mounted on a shaft 34 that is driven from the shaft 15 as hereinafter described. This fan 33 extends across the machine between the side plates 11 and 12 and is enclosed by a suitable housing 33a that is secured in any suitable manner to the frame structure. The transverse blast of air from the fan 33 removes dust and chaff from the corn and carries it outwardly through a duct 35, all as best shown in Figure 3. The screw conveyor 31 delivers the shelled corn to an elevator 36 that is suitably secured to the frame on the outer side of the side plate 12, from which elevator the corn is discharged into a chute 37 that leads to a wagon or other receptacle.

In the present construction the cobs are discharged from the cylindrical housing or shelling cage 18 in a radial direction instead of axially as is conventional in shellers of this type, and to this end the discharge end of the cylindrical housing 18 is provided with an enlarged portion or hood 41 above the end of the housing 18, as best shown in Figures 3 and 6, for receiving the shelled cobs as they are forced radially outwardly from the housing 18 by the action of the shelling cylinder 14. This housing portion 41 is provided with a laterally facing opening 42 (Figure 6) through which the cobs are ejected onto a riddle or cleaning shoe to be presently described. The opening 42 is controlled by a closure member or gate, indicated as an entirety by the reference numeral 43, that is pivotally or hingedly connected to the rear wall of the cob port housing 41 adjacent the rear end of the opening, as indicated at 44 in dotted lines in Figure 5. The gate 43 comprises a curved front wall section 43a that is adapted to normally close the opening 42, and a substantially triangular-shaped top section 43b formed integral with the section 43a and adapted to extent over the top wall of the enlarged housing portion 41 when the gate is in closed position, and when the gate is in open position said top wall 43b closes the space between the curved section 43a of the gate and the top wall of the housing portion 41 and prevents cobs from being thrown or forced out upwardly between the housing 41 and the gate section 43a as will be readily apparent. This gate 43 is adapted to be held normally in closed position by a coiled spring 45 that is connected at one end to a lug 46 suitably secured to the enlarged housing portion 41, and at its opposite end to an angle bracket 47 secured in any suitable manner to the top wall 43b of the gate. The lug 46 and the angle bracket 47 are each provided with a plurality of holes 49, 50, respectively, (see Figures 5 and 6) for connecting the ends of the spring 45 thereto, whereby the tension of the spring may be adjusted by connecting it in different holes in the lug and angle bracket, as will be readily understood. The spring 45 automatically moves the gate toward its closed position when the volume of cobs discharged from the housing is light, but permits the gate to open as the volume of cobs becomes greater.

The purpose of providing the gate 43 is to retard the flow of the cobs sufficiently to permit the shelling mechanism to shell the cobs clean before they are ejected from the shelling housing, and the controlling spring has been made adjustable so that it can be set at the proper tension so that the rate of flow of the ears of corn through the machine may be made as rapid as is consistent with clean shelling. This spring controlled gate 43 in yieldingly retarding the outflow of cobs from the cylinder housing 18 tends to keep the housing full of ears of corn, and under such conditions the sheller operates at its greatest efficiency, as the rubbing of the ears together is effective in shelling the corn just as well as is the rubbing of the ears against the perforated sheet 27.

In the present construction I also provide a second means whereby the radial discharge of the cobs from the housing 18 into the enlarged housing portion 41 may be adjusted. This second adjusting means comprises a sliding collar 55 that fits around the outside of the cylindrical housing 18 at the discharge end thereof (Figures 1, 5 and 6) and extends through a slot provided therefor in the side wall 41a of the enlarged housing portion 41 whereby said collar may be moved into the housing portion 41 so as to partially close the outlet opening from the cylindrical housing 18 into such enlarged housing portion 41. This sliding collar 55, as best shown in Figures 5 and 6, is adapted to be fixed in any adjusted position by means of bolts 56 that are supported by angle brackets 57 riveted or otherwise suitably secured to the enlarged housing portion 41 and extend through slots 58 in the collar. The edge 59 of the adjustable collar 55 that extends into the enlarged housing portion 41 is tapered outwardly toward the opening 42 in the housing portion 41, as shown in Figure 5, so as to prevent cobs from becoming wedged against the edge, since pressure against the cobs from within the cylinder tends to clear them rather than wedge them more tightly.

The cobs are discharged through the opening 42 upon a riddle or cleaning shoe 61 which in the present construction is positioned alongside of the shelling housing 18 and extends the full length thereof. By positioning this cleaning shoe 61 alongside of the shelling housing it is possible to provide a shoe of relatively large area without materially increasing the width of the machine as is the case in shellers in which the shelled cobs are discharged axially from the machine and wherein the cleaning shoe must be positioned at one end of the shelling housing. The curvature of the wall 43a of the gate 43 is provided so that the gate will direct the cobs back toward the center of the shoe. As best shown in Figure 6, the lower edge of the curved wall 43a of the cob door 43 curves upwardly away from the pivot 44 and the riddle or shoe screen 61 is angled downwardly so that the bottom edge of the wall 43a of the gate clears the top surface of the cleaning shoe 61 by a substantial margin so that any kernels of corn that are ejected from the housing with the cobs will not be directed toward the center of the cleaning shoe but will pass under the lower edge of the gate and will travel straight down the shoe until they drop through one or another of the perforations 62 in the shoe, whereby the kernels of corn will pass through the cleaning shoe without interfering with the passage of other kernels of corn therethrough that are dislodged from the cobs as the latter are directed and move toward the central portion of the shoe.

The upper edge of the perforated sheet 27 of the cylindrical shelling housing 18 at the opening 42 is rolled as shown at 63 (Figures 6 and 7) to provide a smooth edge for the cobs to pass over as they are being ejected whereby the danger of the cobs catching on such edge and jamming the machine is eliminated. A suitable plate 64 is also provided between the edge of the cleaning shoe and the rolled edge 63, one side edge of said plate lapping over the upper surface of the shoe and the other side edge extending under the rolled edge 63, as best shown in Figure 7, whereby cobs and husks are prevented from catching on the edge of the cleaning shoe or getting caught between the edge of the shoe and the rolled edge 63. Axially of the sheller away from the cob port 42 the upper edge of the plate 64 overlaps the top plate of the housing 18, as best shown in Figure 6. If desired, the plate 64 may be omitted and the roll 63 formed on the edge of the perforated sheet 27 adjacent the cob port 42.

The shoe 61 is provided at each side with an upwardly turned flange 66 and said flanges are secured in any suitable manner, as by bolts 67, to the upwardly extending side sheets 68 of a U-shaped return pan 69 (Figure 3) positioned below the cleaning shoe 61 whereby the cleaning shoe 61 is supported by said pan. The return pan receives the shelled corn that is delivered to the cleaning shoe and that drops down through the openings 62 in said shoe, the pan acting to deliver the shelled corn to the screw conveyor 31. An arm 71 is bolted to each of the side sheets 68 of the pan 69, as shown at 72 (Figures 2 and 3), and each of said arms extends inwardly and is connected in any suitable manner to a supporting bearing 73 that is mounted eccentrically on the adjacent end of a shaft 74 that extends across the machine and is driven from the shaft 15 as hereinafter described. By this means the shoe 61 and the return pan 69 are both supported and agitated by the shaft 74. In this connection it is to be noted that the eccentric bearing 73 at the cob receiving end of the shoe 61 as shown in Figure 5 has a greater throw or amount of eccentricity than the eccentric bearing 73 at the opposite end of the shoe 61 as shown in Figure 9, and such difference of throw is provided in order to impart a greater amplitude of oscillation to the end of the shoe adjacent the cob outlet 42 so as to cause the cobs to move toward the center of the shoe and also to avoid weakening of the shaft 74 behind the driving sprocket 94. Means is also provided for supporting the outer end of the cleaning shoe 61 and the return pan 69, and such means comprises a pair of tie rods 75 one of which is connected to each of the side sheets 68 and to an appropriate part of the sheller housing, and such tie rods are made sufficiently flexible to compensate for the movement of the shoe and pan under the action of the eccentric bearings 73. Suitable guide means are provided on the cleaning shoe for directing the cobs toward the center thereof, and such guide means are in the form of baffle bars 76 that are riveted or otherwise suitably secured on the upper surface of the shoe, and suitable means is also provided for retarding the movement of the cobs on the shoe, said latter means being in the form of a canvas 77 that is hung from a rod 78 extending across the shoe and supported at its ends in any suitable manner on the side sheets 68 of the return pan 69.

The cobs are discharged from the shoe upon the lower end of a cob stacker 79 which conveys the cobs away from the sheller. As shown in Figure 8, the cob stacker is connected to the sheller by a single pin 81 that extends through aligned openings in a supporting bracket 82 on the stacker and through a pair of brackets 83 fixed in any suitable manner to the frame bar 13 of the sheller and extending forwardly therefrom. When it is desired to remove the cob stacker 79 from the sheller it is only necessary to disconnect and remove the conveyor chain 84 of the stacker from its driving sprocket 85 that is carried on a shaft 86 supported by the brackets 83, after which the pin 81 is removed to disconnect the stacker from the sheller frame.

As shown in Figure 2, the power for driving the entire assembly is transmitted to the shelling mechanism through the pulley 17 fixed on one end of the cylinder shaft 15 as above mentioned, and to this end a hardened steel roller chain 88 is trained around a slip drive sprocket fixed on the shaft 15 on the inner side of the pulley 17 and around a sprocket 91 keyed to the fan shaft 34, a sprocket 92 keyed to the screw conveyor shaft 32, a sprocket 93 keyed to the cob stacker shaft 86, and a sprocket 94 keyed to the agitating shaft 74, so that rotating the pulley 17 drives all of the parts of the sheller.

I claim:

1. A corn sheller comprising, in combination, a shelling housing having an inlet and a discharge, a shelling cylinder therein, means on said shelling cylinder for forcing the shelled cobs radially outwardly from said cylinder, an enlarged housing section at the discharge end of the shelling housing for receiving the shelled cobs, means in said enlarged housing section for varying the size of the opening between said housing and said enlarged section for retarding the flow of cobs from said shelling housing into said enlarged section, and means outside of said housing for adjusting the position of said means.

2. A corn sheller comprising, in combination, a shelling housing having an inlet and a discharge, a shelling cylinder therein, means on said shelling cylinder for forcing the cobs radially outwardly from said cylinder through said discharge, an enlarged housing section at the discharge end of the shelling housing for receiving the cobs, and a plate movable axially of the cylinder into and out of said enlarged housing section for varying the size of the opening between the shelling housing and said enlarged section for retarding the flow of cobs from said shelling housing.

3. A corn sheller comprising, in combination, a shelling housing having an inlet and a discharge, a shelling cylinder therein, means on said shelling cylinder for forcing the cobs radially outwardly from said cylinder, and an enlarged housing section at the upper portion of the discharge end of the shelling housing for receiving the shelled cobs, a plate movable into and out of said enlarged housing section for varying the size of the opening between the shelling housing and said enlarged section for retarding the flow of shelled cobs from said shelling housing, an outlet opening at one side of said enlarged housing section, and means outside of said housing section for adjusting the position of said plate, the edge of said plate adjacent said outlet opening being tapered outwardly toward said outlet opening to prevent wedging of the cobs against said edge.

4. A corn sheller comprising, in combination, a shelling housing having an inlet and a discharge, a shelling cylinder therein, means on said shelling cylinder for forcing the shelled cobs radially outwardly from said cylinder, and an enlarged housing section at the upper portion of the discharge end of the shelling housing for receiving the shelled cobs, a plate movable into and out of said enlarged housing section for varying the size of the opening between the shelling housing and said enlarged section for retarding the flow of cobs from said shelling housing, an outlet opening at one side of said enlarged housing section, means outside of said housing for adjusting the position of said plate, and spring-controlled gate means for closing said opening to retard the flow of cobs therethrough but permitting said gate to open under the force of the outflowing cobs.

5. A corn sheller comprising, in combination, a shelling housing, a rotatable shelling head disposed in said housing, an opening at the discharge end of said housing and facing in a generally horizontal direction tangentially with respect to said shelling head, said shelling head including means for ejecting the shelled cobs through said tangentially facing opening, a cob shoe disposed underneath said opening and extending from said discharge end along the shelling housing toward the other end of the latter, a gate supported on vertically extending pivots disposed at the side of said opening adjacent the discharge end of the shelling housing for closing said opening and movable away from said opening under the action of the cobs being ejected to permit exit of said cobs from said housing and to direct said cobs over said cob shoe generally toward the other end of said shelling housing, and spring means acting to force said gate toward closed position against the action of the outflowing cobs.

6. A corn sheller as defined in claim 5 having means for closing the space between the upper part of said cob gate and said housing adjacent the upper part of the opening in the latter.

7. A corn sheller comprising, in combination, a shelling housing from which the cobs are ejected in a radial direction through an opening at one end thereof, a cleaning shoe positioned alongside of said shelling housing and extending substantially the entire length of the latter for receiving at one end the shelled cobs from said opening, and means comprising a gate normally closing said opening and movable away from the opening under the action of the ejected cobs, said gate being formed to direct the ejected cobs from the end of the shoe adjacent said opening towards the center of the shoe.

8. A corn sheller comprising, in combination, a shelling housing having an inlet end and a discharge end, a shelling cylinder in said housing, means on said shelling cylinder for forcing the shelled cobs radially outwardly from said cylinder at the discharge end thereof, an enlarged housing section at the upper portion of the discharge end of the shelling housing for receiving the shelled cobs, a plate movable into and out of said enlarged housing section for varying the size of the opening between the shelling housing and said enlarged section for retarding the flow of cobs from said housing, means outside of said housing for adjusting the position of said plate, a laterally facing outlet opening in said enlarged housing section through which the cobs are ejected, a gate extending across said outlet opening, and means for normally holding said gate in closed position, said gate opening against the action of said closing means under pressure of the cobs being ejected through said outlet opening.

9. A corn sheller comprising, in combination, a shelling housing having an inlet end and a discharge end, a shelling cylinder in said housing, means on said shelling cylinder for forcing the shelled cobs radially outwardly from said cylinder at the discharge end thereof, an enlarged housing section at the upper portion of the discharge end of the shelling housing for receiving the shelled cobs, a plate movable into and out of said enlarged housing section for varying the size of the opening between the shelling housing and said enlarged section for retarding the flow of cobs from said housing, means outside of said housing for adjusting the position of said plate, an outlet opening in said enlarged housing section through which the cobs are ejected, a gate extending across said outlet opening, spring means for normally holding said gate in closed position, said gate opening against the action of said spring means under pressure of the cobs being ejected from said housing, and means for adjusting the tension of said spring means.

10. In a corn sheller comprising a frame, and means supported by said frame for shelling the ears of corn, means for receiving the cobs from said shelling means, the combination of a cob stacker for receiving said cobs from said receiving means and including an endless chain conveyor, one flight of which is supported so as to accommodate changes in the effective length of the chain conveyor, means connecting said cob stacker to said frame comprising a bracket connected to said cob stacker, a bracket connected to said frame, and a pin extending through aligned openings in said two brackets and a driving sprocket over which said conveyor chain is trained, said sprocket being supported on said frame-connected bracket for rotation about an axis parallel to the axis of said pin but spaced sufficiently close thereto that changes in the effective length of the conveyor due to the support of the cob stacker in different angular positions will be accommodated by said one flight of the conveyor chain.

11. A corn sheller comprising, in combination, a shelling housing having an inlet opening at one end and a discharge opening at the other end, a cleaning shoe positioned alongside of said shelling housing and below said discharge opening for receiving the ejected cobs and extending substantially the full length of the shelling housing, a gate disposed adjacent said opening and arranged at an angle to said discharge opening so as to direct the cobs toward the center of the shoe, the lower edge of said gate being positioned above the upper surface of said shoe a distance sufficient to permit kernels of corn ejected with the cobs to pass under said gate.

12. A corn sheller comprising, a shelling housing, a cleaning shoe positioned alongside of said shelling housing and extending substantially the entire length of the latter, a laterally facing discharge opening at one end of said housing for delivering shelled cobs to one end of said shoe, a shaft for supporting said shoe, and means including eccentrics connecting opposite end portions of said shoe with opposite end portions of said shaft to impart oscillatory movement to said shoe from said shaft, the eccentric adjacent said one end of the cleaning shoe having a greater throw than the other eccentric so that the end of said shoe receiving the cobs from said discharge opening has greater amplitude of oscillation than the opposite end of said shoe whereby the cobs will tend to move from the cob receiving end of the shoe toward the opposite end thereof.

13. A corn sheller comprising, in combination, a shelling housing, a laterally facing opening at the discharge end of said housing, a cob shoe extending from said opening alongside said housing substantially to the other end thereof, means in said housing for ejecting the shelled cobs through said laterally facing opening, a gate including a front wall section for closing said opening and a top wall section, said gate sections being swingable together about vertically extending pivots and said gate being movable away from said opening under the action of the cobs being ejected to permit exit of said cobs from said housing, and means acting to force said gate toward closed position against the action of the outflowing cobs, said front wall section of the gate when in open position being disposed at an angle so as to force the outflowing cobs to move laterally of said opening generally toward the opposite end of said cob shoe and said top wall closing the opening between the front wall and the housing to prevent the cobs from being forced upwardly between said front wall and said housing, said top wall extending over said housing when said gate is in closed position.

14. A corn sheller comprising, in combination, a shelling housing, a laterally facing opening at the discharge end of said housing, a cob shoe extending from said opening alongside said housing substantially to the other end thereof, means in said housing for ejecting the shelled cobs through said laterally facing opening, a gate for closing said opening and movable away from said opening under the action of the cobs being ejected to permit exit of said cobs from said housing, spring means acting to force said gate toward closed position against the action of the outflowing cobs, and means supporting said gate on said housing at such an angle to the direction of discharge of said cobs that the latter are directed generally longitudinally of said cob shoe.

15. A corn sheller comprising, in combination, a sheet metal shelling housing having an opening therein through which the shelled cobs are ejected, a cleaning shoe positioned below said opening for receiving the shelled cobs delivered therethrough, the edge of the sheet metal of said housing defining the lower portion of said opening being rolled to provide a smooth edge, and a plate having one edge overlapping the inner edge of the shoe adjacent the housing and its other edge extending under said rolled edge of the housing, whereby a smooth and unobstructed surface is presented to the cobs being delivered through the opening to the shoe.

16. A corn sheller comprising, in combination, a shelling housing from which the cobs are ejected in a radial direction through an opening at one end thereof, a housing surrounding said opening and receiving the cobs therefrom, and a curved plate generally concentric with respect to and supported for axial movement on the exterior of said shelling housing, said curved plate being movable to positions within said second housing so as to vary the effective size of the opening leading from the shelling housing to said second housing.

17. A corn sheller comprising, in combination, a shelling housing from which the cobs are ejected in a radial direction through an opening at one end thereof, a cleaning shoe positioned alongside said shelling housing and extending substantially the entire length of the latter for receiving at one end the shelled cobs from said opening, and means comprising a gate normally closing said opening and movable away from said opening under the action of the ejected cobs, said gate operating to direct the ejected cobs from the end of the shoe adjacent said opening toward the center of the shoe.

18. A corn sheller comprising, in combination, a frame, means supported by said frame for shelling ears of corn, means for driving said shelling means, a cob stacker receiving cobs from said shelling means and including an endless conveyor chain one flight of which is supported so as to accommodate changes in the effective length of the conveyor chain, means connecting said cob stacker to said frame comprising a bracket connected to said cob stacker, a second bracket connected to said frame, and a pin extending through aligned openings in said two brackets, and means for driving said cob conveyor chain including a sprocket mounted for rotation on one of said brackets about an axis parallel to and spaced from said connecting pin, the spacing being sufficiently small that changes in the effective length of the conveyor chain due to the disposition of the cob in different angular positions about the axis of said pin will be accommodated by said one flight of the conveyor chain, and means operatively connecting said sprocket with said sheller driving means.

19. A corn sheller comprising, in combination, a shelling housing having an inlet and a discharge, a shelling cylinder therein, means on said shelling cylinder for forcing the shelled cobs radially outwardly from said cylinder, a housing section at the discharge end of the shelling housing for receiving the shelled cobs that are forced radially outwardly from said shelling housing by said means, adjustable plate means supported on the exterior of the shelling housing and movable generally axially thereof into said housing section for varying the size of the opening between said housing and said section for retarding the radial flow of cobs from the shelling housing into said housing section, and means carried by said housing section for fixing said plate means in position.

20. A corn sheller comprising, in combination, a shelling housing having an inlet and a discharge, a shelling cylinder therein, means on said shelling cylinder for forcing the shelled cobs radially outwardly from said cylinder, a housing section at the discharge end of the shelling housing for receiving the shelled cobs, and a plate having an edge tapered outwardly and shiftable longitudinally of the shelling housing for varying the size of the opening between the shelling housing and said housing section.

21. A corn sheller comprising a shelling housing, a shelling head rotatable therein and including a drive shaft therefor journaled in said housing, the latter having a discharge opening through which cobs are discharged in a lateral direction at one side of said shelling housing, a full length cob shoe supported along said one side of the shelling housing and extending substantially the entire length thereof, an eccentric carried by said drive shaft at each end of said shelling head, and a connection extending from each eccentric to the associated end of said cob shoe for reciprocating the latter generally laterally toward and away from the shelling housing.

22. A corn sheller having a shelling housing, and a shelling head rotatable therein, said housing having a generally cylindrical wall having a discharge opening near one end thereof, said opening being defined by a pair of circumferentially extending edges in said wall which diverge with respect to each other in the circumferential direction of rotation of said shelling head to prevent the cobs from wedging in said opening.

23. A corn sheller comprising, in combination, a shelling housing having an inlet and a discharge, a shelling cylinder therein, means on said shelling cylinder for forcing the shelled cobs radially outwardly from said cylinder, an enlarged housing section at the discharge end of the shelling housing for receiving the shelled cobs, means forming a cob discharge opening in said enlarged housing section, said enlarged housing section being closed except for said cob discharge opening, adjustable means between said enlarged housing section and said cob forcing means on the shelling cylinder for retarding the flow of cobs from said shelling housing into said enlarged section, and biased means controlling the discharge of cobs through the cob discharge opening of said enlarged housing section.

FRANK T. COURT.